United States Patent

Nakata et al.

[11] Patent Number: 5,818,009
[45] Date of Patent: Oct. 6, 1998

[54] LASER BEAM MACHINING SYSTEM

[75] Inventors: Yoshinori Nakata; Atsushi Mori, both of Yamanashi, Japan

[73] Assignee: Fanuc, Ltd, Yamanashi, Japan

[21] Appl. No.: 531,587

[22] Filed: Sep. 21, 1995

[30] Foreign Application Priority Data

Oct. 25, 1994 [JP] Japan ................................. 6-260146

[51] Int. Cl.⁶ .................................................. B23K 26/14
[52] U.S. Cl. ................................ 219/121.84; 219/121.67; 239/601
[58] Field of Search ....................... 219/121.84, 121.67; 239/597, 601, DIG. 19

[56] References Cited

U.S. PATENT DOCUMENTS

| 3,373,752 | 3/1968 | Inoue ................................. 219/121.84 |
| 3,693,884 | 9/1972 | Snodgrass et al. ............... 239/DIG. 19 |
| 4,784,491 | 11/1988 | Penney et al. ..................... 219/121.84 |
| 4,952,770 | 8/1990 | Hayashi ............................. 219/121.84 |
| 5,122,632 | 6/1992 | Kinkelin ............................ 219/121.84 |

FOREIGN PATENT DOCUMENTS

| 59-163093 | 9/1984 | Japan . |
| 61-135496 | 6/1986 | Japan ................................ 219/121.84 |

Primary Examiner—Geoffrey S. Evans
Attorney, Agent, or Firm—Staas & Halsey

[57] ABSTRACT

A laser beam machining system is provided whereby a distribution of flow velocity of an assist gas suited for high-speed cutting is obtained. A nozzle has a nozzle hole for emitting the laser beam and the assist gas therethrough. A helical groove is formed in the inner surface of the nozzle hole. The groove may be a V-shaped groove, that is, an internal thread-type groove. In the case of cutting a workpiece with the nozzle mounted to the laser beam machining system, the closer to the inner surface of the nozzle hole, the slower the flow velocity of the ejected assist gas becomes. Accordingly, the assist gas is ejected at high flow velocity only in the vicinity of the focal point of the laser beam, thus permitting high-speed cutting.

2 Claims, 5 Drawing Sheets

FIG. 5

| NOZZLE TYPE | M2 P0.4 THREADED TYPE | φ0.9 | φ1.56 | φ2.0 CONVENTIONAL TYPE |
|---|---|---|---|---|
| THICKNESS (mm) | MAXIMUM LASER BEAM CUTTING SPEED (m/min) | | | |
| 1.0 | 8.0 | 8.0 | 8.0 | 5.5 |
| 1.6 | 6.25 | 6.25 | 5.75 | 5.25 |
| 2.3 | 5.25 | 5.25 | 4.75 | 4.0 |
| 3.2 | 4.5 | 4.5 | 3.75 | 3.25 |
| 4.5 | 3.0 | 3.0 | 2.75 | 2.25 |

LASER BEAM MACHINING SYSTEM

BACKGROUND OF THE INVENTION (1) Field of the Invention

The present invention relates to a laser beam machining system for machining a workpiece while ejecting an assist gas, and more particularly, to a laser beam machining system in which a laser beam and an assist gas are emitted from the same opening.

(2) Description of the Related Art

Laser beam machining is a method wherein a laser beam with high-intensity energy, obtained by generating coherent, monochromatic light and then focusing the light by means of a light converging lens, is irradiated onto a very small area on a workpiece to thereby evaporate and melt the workpiece. Since a laser beam has good controllability, complicated and fine machining can be carried out by controlling the laser beam machining with the use of a numerical control device.

To efficiently carry out the laser beam machining, there has been employed a method in which oxygen gas is used as an assist gas for promoting the melting of a workpiece. The assist gas serves to promote the melting of a workpiece by means of the heat of oxidation, in addition to the heat of the laser, and also to scatter and thereby remove molten metal from the machining spot.

In laser beam machining systems using the assist gas in general, the assist gas and the laser beam are emitted from a nozzle at the same time, and ideally, the assist gas should be ejected as a laminar flow. To this end, the inner surface of the nozzle hole is finished so as to be as smooth as possible.

FIG. 8 is a sectional view of a conventional nozzle. A nozzle 80 has a hole 81 formed therein for emitting the laser beam and the assist gas. The nozzle hole 81 has a very smooth inner surface 82.

The nozzle hole 81 has a diameter sufficiently greater than the beam diameter of the emitted laser beam. The beam diameter increases with the output of the laser beam; therefore, a larger-diameter nozzle is used for a higher-output laser beam machining system.

The distribution of flow velocity of the assist gas ejected from the nozzle tip is affected by the diameter of the nozzle hole and the shape of the inner surface of the same. Accordingly, the function of the assist gas to promote the cutting should vary depending on the diameter of the nozzle hole and the shape of the inner surface of the same.

However, it has not been ascertained yet whether the smoothness of the inner surface of the nozzle hole is actually effective in speeding up the laser beam cutting or not. Nevertheless, a nozzle with a nozzle hole having a smooth inner surface has conventionally been used also for machining operation requiring high-speed cutting.

SUMMARY OF THE INVENTION

The present invention was created in view of the above circumstances, and an object thereof is to provide a laser beam machining system whereby a distribution of flow velocity of an assist gas suited for high-speed cutting is obtained.

To achieve the above object, the present invention provides a laser beam machining system for machining a workpiece while ejecting an assist gas, the system comprising a nozzle having a nozzle hole constituting a laser beam irradiation path and an assist gas ejection path, the nozzle hole having an uneven inner surface.

During the cutting operation, the assist gas is ejected through the nozzle hole toward a workpiece. In this case, the uneven inner surface of the nozzle hole serves as a resistance and decreases the flow velocity of the assist gas passing near the inner surface of the nozzle hole. Thus, the assist gas flows at high speed only in the central region of the nozzle hole and is ejected efficiently to the laser beam irradiation spot. Accordingly, the distribution of flow velocity of the assist gas can be optimized.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(B) is a graph showing the flow velocity distribution obtained with a nozzle of which the nozzle hole has an internal thread-type groove formed in the inner surface thereof;

FIG. 5 is a table showing the results of measurement of the maximum workpiece cutting speed obtained with different nozzle types;

DESCRIPTION OF THE PREFERRED EMBODIMENTS

Embodiments of the present invention will be hereinafter described with reference to the drawings.

Figure 1:
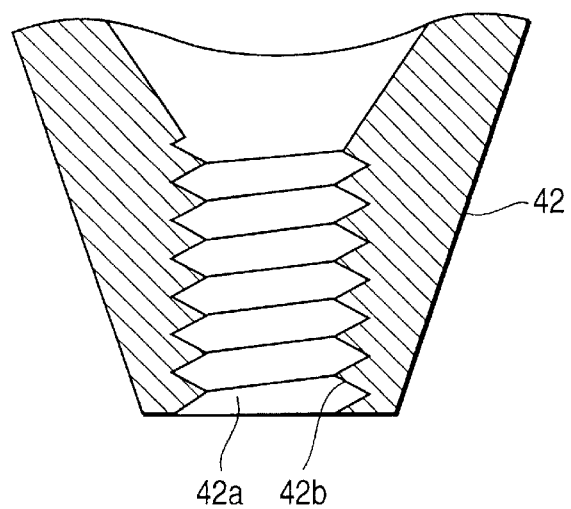
FIG. 1 is a sectional view showing a first example of a nozzle used in a laser beam machining system according to the present invention.

FIG. 1 is a sectional view showing a first example of a nozzle used in a laser beam machining system according to the present invention. A nozzle 42 has a nozzle hole 42a for emitting a laser beam and an assist gas therethrough. The nozzle hole 42a has a helical groove 42b formed in the inner surface thereof. The groove 42b is a V-shaped groove, that is, an internal thread-type groove.

In the case where a workpiece is cut with the nozzle 42 mounted to a laser beam machining system, the closer to the inner surface of the nozzle hole 42a, the slower the flow velocity of an ejected assist gas becomes. Consequently, the assist gas of high flow velocity impinges only on an area in the vicinity of the focal point of the laser beam, thus permitting high-speed cutting.

Further, an internal thread-type groove can be formed easily, facilitating the manufacture of the nozzle.

Figure 2:
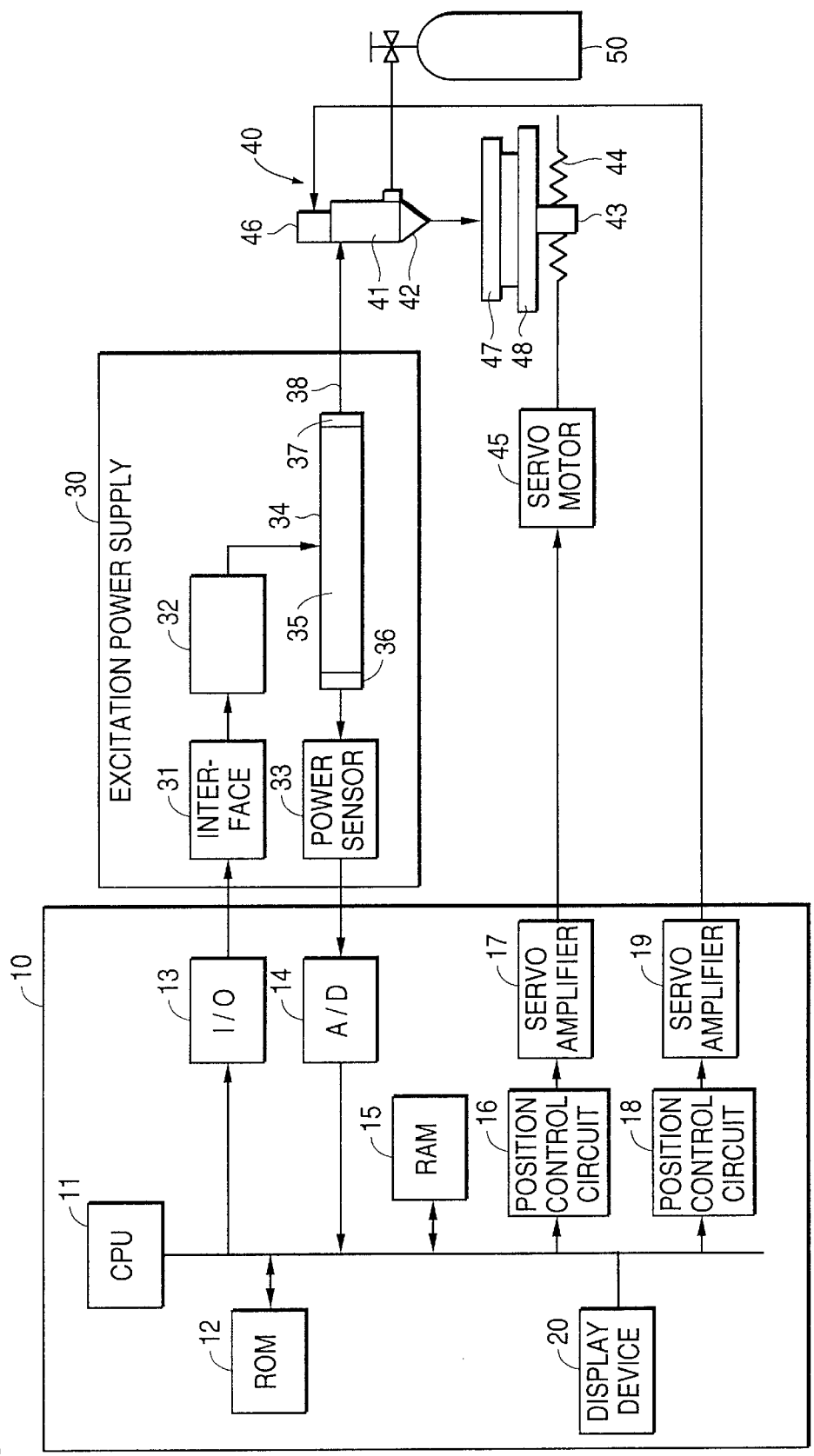
FIG. 2 is a diagram illustrating the entire configuration of a laser beam machining system to which the present invention is applied.

FIG. 2 illustrates the entire configuration of a laser beam machining system to which the present invention is applied.

As shown in FIG. 2, the laser beam machining system comprises a numerical control device (CNC) 10, a laser oscillator 30, and a laser beam machine 40.

The CNC 10 has a processor 11 as a central component thereof. The processor 11 reads out a machining program etc. stored in a RAM 15 and controls the entire operation of the laser beam machine 40, in accordance with a system program and a program for carrying out the present invention stored in a ROM 12. The RAM 15 is a non-volatile RAM for storing a machining program, various parameters, etc., and a CMOS with battery backup is used for the RAM 15. A display device 20 comprises a CRT, a liquid crystal display device or the like.

The processor 11 supplies an output command signal to an interface 31 of the laser oscillator 30 through an I/O unit 13. The interface 31 converts the output command signal supplied thereto to a current command signal, which is then output. An excitation power supply 32 rectifies commercial power, performs switching operation to generate a high-frequency voltage, and supplies a discharge tube 34 of the laser oscillator with a high-frequency voltage corresponding to the current command signal from the interface 31.

A laser gas 35 is circulated within the discharge tube 34. When applied with a high-frequency voltage from the excitation power supply 32, the discharge tube 34 produces an electric discharge and thus the laser gas 35 therein is excited. A rear mirror 36 and an output mirror 37 constitute a Fabry-Perot resonator, which excites the molecules of the laser gas 35 and outputs a laser beam 38 to the outside. A power sensor 33 comprises a thermoelectric, photoelectric converter, or the like, and measures the output power of the laser beam 38 by means of part of the laser beam transmitted through the rear mirror 36. An A/D converter 14 converts the output of the power sensor 33 to a digital signal, which is then supplied to the processor 11.

The laser beam machine 40 includes a machining head 41 for irradiating the laser beam 38 onto a workpiece 47 and a table 48 on which the workpiece 47 is fixed. The laser beam 38, which has been introduced into the machining head 41 and then focused, is irradiated from the nozzle 42 onto the workpiece 47. The nozzle hole of the nozzle 42 has an internal thread formed in the inner surface thereof. The machining head 41 is supplied with oxygen gas from a gas cylinder 50. The oxygen gas is ejected from the distal end of the nozzle 42 as an assist gas.

In accordance with a command from the processor 11, a position control circuit 16 of the CNC 10 controls the rotation of a servomotor 45 via a servo amplifier 17 to thereby control the movement of the table 48 by means of a ball screw 44 and a nut 43, whereby the position of the workpiece 47 is controlled. Although FIG. 2 illustrates only one axis, in practice, a plurality of control axes are provided. A position control circuit 18 controls the rotation of a servomotor 46 via a servo amplifier 19, in accordance with a command from the processor 11, to thereby control the position of the machining head 41. As the table 48 and the machining head 41 move, the laser beam 38 emitted from the nozzle 42 traces a locus on the workpiece 47, whereby the workpiece 47 is cut into a predetermined shape.

Figure 3:
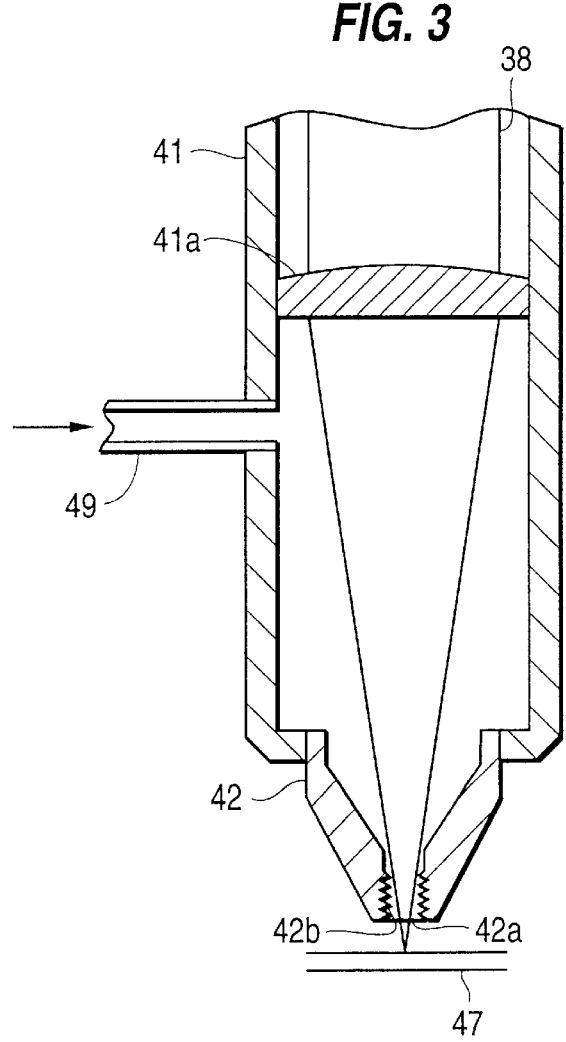
FIG. 3 is a sectional view of a machining head.

FIG. 3 is a sectional view of the machining head. A light converging lens 41a is arranged inside the machining head 41, and the laser beam 38 introduced into the machining head 41 is focused by the light converging lens 41a and then irradiated onto the workpiece 47. An assist gas inlet 49 opens in the inner surface of the machining head 41. The assist gas supplied from the gas cylinder 50 (FIG. 2) is introduced into the machining head 41 through the assist gas inlet 49.

The nozzle 42 is mounted to the distal end of the machining head 41. The nozzle hole 42a is formed in the nozzle 42 to let out the laser beam and the assist gas therethrough. The nozzle hole 42a has the internal thread-type groove 42b formed in the inner surface thereof.

The assist gas fed into the machining head 41 is ejected through the nozzle hole 42a toward the workpiece 47.

Figure 4A:
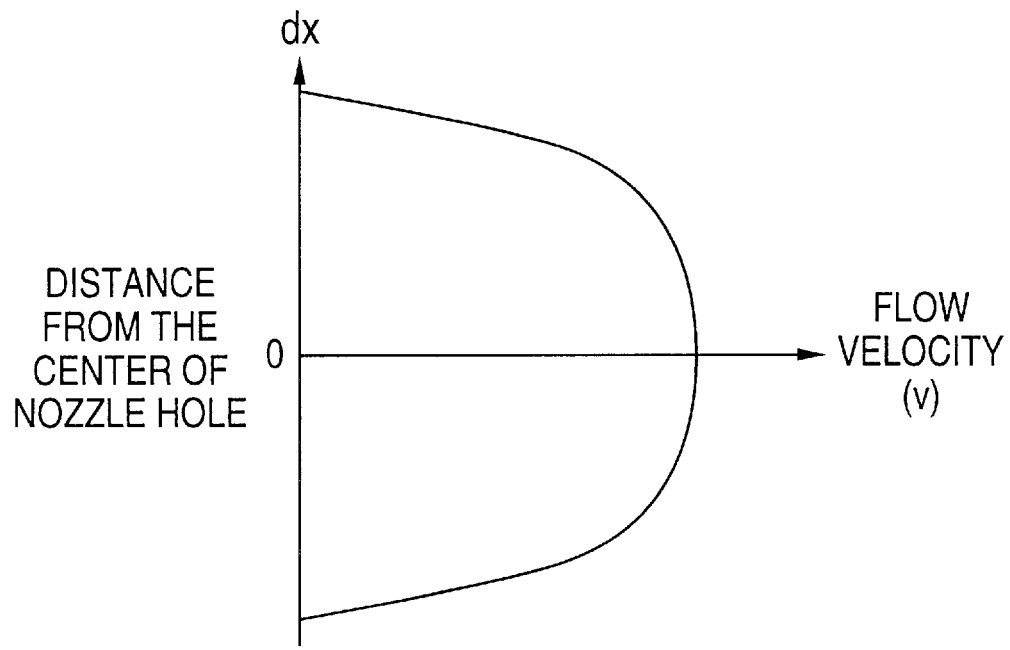
FIGS. 4(A), 4(B) illustrate the distributions of flow velocity of assist gas at the outlets of nozzle holes having different shapes, wherein FIG. 4(A) (prior art) is a graph showing the flow velocity distribution obtained with a nozzle of which the nozzle hole has a smooth inner surface.
Figure 4B:
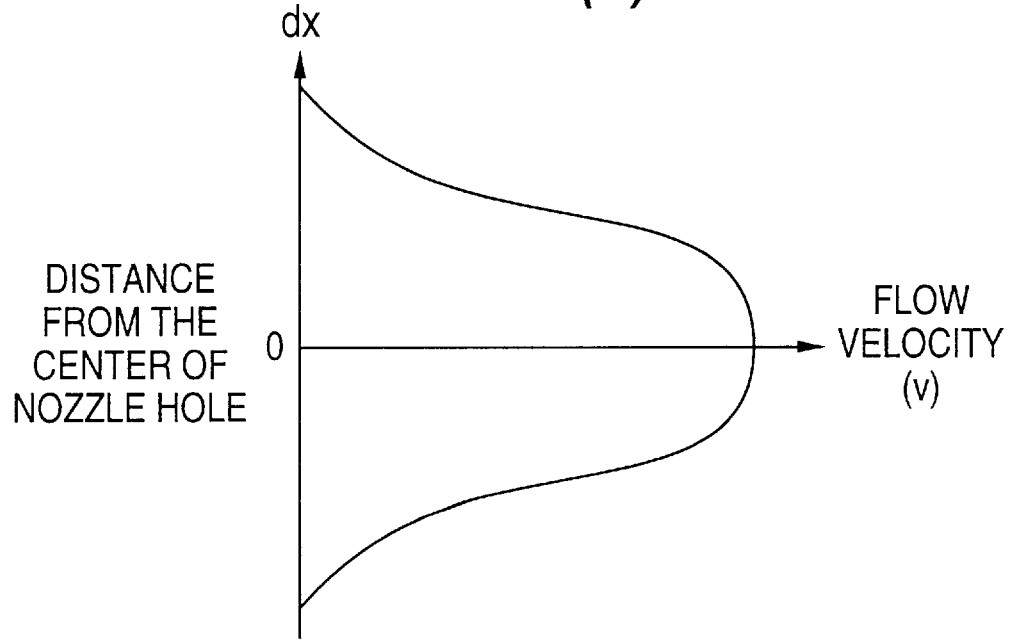
Figure 8:
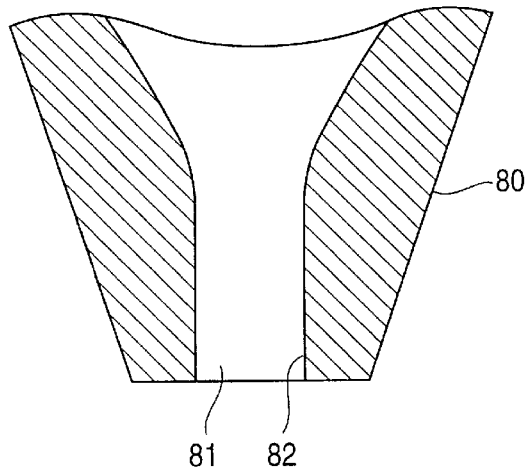
FIG. 8 (prior art) is a sectional view of a conventional nozzle.

FIGS. 4(A) and 4(B) illustrate the distributions of flow velocity of the assist gas at the outlets of the nozzle holes with different shapes, wherein FIG. 4(A) shows the flow velocity distribution obtained with the nozzle of FIG. 8 whose nozzle hole has a smooth inner surface, and FIG. 4(B) shows the flow velocity distribution obtained with the nozzle of FIG. 1 whose nozzle hole has the internal thread-type groove formed in the inner surface thereof. For the measurement of FIG. 4(A), a nozzle with a nozzle hole having an inner diameter of 1.56 mm was used, and for the measurement of FIG. 4(B), a nozzle with a nozzle hole having a groove M2 (internal coarse screw thread with a major diameter of 2 mm and a minor diameter of 1.56 mm) formed at a pitch P of 0.4 mm was used.

In both FIG. 4(A) and FIG. 4(B), the horizontal axis indicates the flow velocity (v) of the assist gas, and the vertical axis indicates the distance (dx) from the center of the nozzle hole.

In the case of FIG. 4(A), the flow velocity is almost the same except for a region very close to the inner surface of the nozzle hole; the flow velocity sharply drops in the vicinity of the inner surface of the nozzle hole.

By contrast, in the case of FIG. 4(B), the flow velocity is the greatest in the vicinity of the center of the nozzle hole and smoothly decreases with distance from the center of the nozzle hole.

Thus, where the groove is formed in the inner surface of the nozzle hole, the air resistance increases at the inner surface of the nozzle hole, permitting the assist gas to be ejected at high speed only in the vicinity of the central region of the nozzle hole. This makes it possible to cause the assist gas to concentratedly impinge on a very small area on the workpiece onto which the laser beam is irradiated. As a result, the cutting speed can be increased.

Further, even in the case where the diameter of the nozzle hole is very small, the assist gas can be made to impinge on a very small area on the workpiece. For example, where the minimum spot diameter of the laser beam is 0.6 mm, the cutting speed can be increased by using a nozzle of which nozzle hole diameter is 0.9 mm.

In this case, the diameter of the nozzle hole must not be smaller than the beam diameter. The diameter of the laser beam passing through the nozzle hole is slightly greater than the minimum spot diameter. Accordingly, the nozzle hole diameter that permits the cutting speed to be increased and also is free from interference with the laser beam is about 1.5 times the minimum spot diameter of the laser beam.

FIG. 5 shows the results of the measurement of the maximum workpiece cutting speed obtained using different nozzle types. For the measurement, the laser beam output was set to 2 kW (minimum spot diameter of laser beam: 0.6 mm), the focal length was 5", and oxygen was used as the assist gas.

Four types of nozzles were used for the measurement, that is, a nozzle with a nozzle hole having an internal thread-type groove (M2, P0.4) cut in the inner surface thereof, a nozzle having a nozzle hole diameter of 0.9 mm (1.5 times the minimum spot diameter of the laser beam), a nozzle having a nozzle hole diameter of 1.56 mm (equal to the minor diameter of the thread M2), and a nozzle (conventional type) having a nozzle hole diameter of 2.0 mm.

Workpieces with different thickness of 1.0 mm, 1.6 mm, 2.3 mm, 3.2 mm and 4.5 mm were cut for the measurement.

In the case of the nozzle having the internal thread-type groove (M2, P0.4) formed in the inner surface of the nozzle hole, the maximum cutting speed was 8.0 m/min for the workpiece thickness 1.0 mm, 6.25 m/min for the workpiece thickness 1.6 mm, 5.25 m/min for the workpiece thickness 2.3 mm, 4.5 m/min for the workpiece thickness 3.2 mm, and 3.0 m/min for the workpiece thickness 4.5 mm.

The results of the measurement obtained with the nozzle having a nozzle hole diameter of 0.9 mm were the same as those obtained with the nozzle having the internal thread-type groove (M2, P0.4) formed in the inner surface of the nozzle hole.

In the case of the nozzle having a nozzle hole diameter of 1.56 mm, the maximum cutting speed was 8.0 m/min for the workpiece thickness 1.0 mm, 5.75 m/min for the workpiece thickness 1.6 mm, 4.75 m/min for the workpiece thickness 2.3 mm, 3.75 m/min for the workpiece thickness 3.2 mm, and 2.75 m/min for the workpiece thickness 4.5 mm.

In the case of the nozzle having a nozzle hole diameter of 2.0 mm, the maximum cutting speed was 5.5 m/min for the workpiece thickness 1.0 mm, 5.25 m/min for the workpiece thickness 1.6 mm, 4.0 m/min for the workpiece thickness 2.3 mm, 3.25 m/min for the workpiece thickness 3.2 mm, and 2.25 m/min for the workpiece thickness 4.5 mm.

The measurement results mentioned above indicate that the increase of the cutting speed by forming a groove along the nozzle hole or by narrowing the nozzle hole is noticeable particularly in the case where a workpiece with a relatively small thickness is cut.

The measurement also revealed that although the nozzle with the nozzle hole diameter 0.9 mm ensured sufficiently high cutting speed, the cutting operation was subject to directionality. Namely, when the cutting was effected in a certain direction, the quality of the cut surface was poor. This is presumably because, with a nozzle having a hole diameter close to the beam diameter, it is difficult to make the laser beam exactly coincident with the center of the nozzle and thus the cutting becomes unstable depending on the cutting direction.

By contrast, for the nozzle having the groove formed in the inner surface of the nozzle hole, it was experimentally ascertained that not only the maximum speed could be enhanced but also the machining stability could be greatly improved. In the case of the nozzle having the groove cut in the inner surface of the nozzle hole, the flow velocity smoothly changes in the boundary region of gas flow, as seen from the flow velocity distributions shown in FIGS. 4(A), 4(B). This presumably provides the physical and chemical effects that are different from those obtained with the nozzle whose nozzle hole has a smooth inner surface, and contributes to the enhancement of the machining stability.

Therefore, by setting the nozzle hole diameter to a value slightly greater than the beam diameter and also forming a groove in the inner surface of the nozzle hole, it is possible to achieve high-speed and high-quality cutting.

Figure 6:
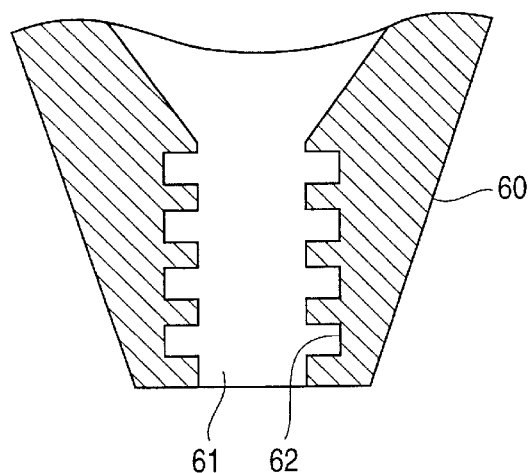
FIG. 6 is a sectional view showing a second example of the nozzle used in the laser beam machining system of the present invention.

FIG. 6 is a sectional view showing a second example of the nozzle used in the laser beam machining system of the present invention. A nozzle 60 has a nozzle hole 61 for emitting the laser beam and the assist gas therethrough. A plurality of annular grooves 62 are cut in the inner surface of the nozzle hole 61. The grooves 62, which are U-shaped grooves, serve to increase the resistance to the assist gas in the vicinity of the inner surface of the nozzle hole 61 and thus cause a high-speed flow of the assist gas to be situated at the central region of the nozzle hole 61.

In the first example shown in FIG. 1, a helical V-shaped groove (internal thread) is cut in the inner surface of the nozzle hole, but the groove may alternatively be a helical U-shaped groove. Similarly, in the second example shown in FIG. 6, although annular U-shaped grooves are cut in the inner surface of the nozzle hole, the grooves may alternatively be annular V-shaped grooves.

Figure 7:
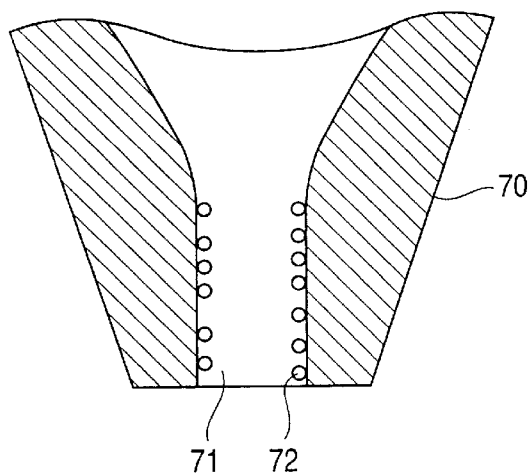
FIG. 7 is a sectional view showing a third example of the nozzle used in the laser beam machining system of the present invention.

FIG. 7 is a sectional view showing a third example of the nozzle used in the laser beam machining system of the present invention. A nozzle 70 has a nozzle hole 71 for emitting the laser beam and the assist gas therethrough. Metal powder 72 is brazed to or deposited on the inner surface of the nozzle hole 71, and thus the inner surface of the nozzle hole 71 is uneven because of the metal powder 72. Consequently, the resistance to the assist gas increases in the vicinity of the inner surface of the nozzle hole 71 and a high-speed flow of the assist gas can be situated at the central region of the nozzle hole 71.

As described above, according to the present invention, the inner surface of the nozzle hole is made uneven to increase the resistance to the assist gas in the vicinity of the inner surface of the nozzle hole, whereby the distribution of flow velocity of the assist gas can be optimized, permitting high-speed and stable laser beam cutting.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A laser beam machining system for machining a workpiece while ejecting an assist gas, comprising:

a nozzle having a nozzle hole forming a laser beam irradiation path and an assist gas ejection path, the nozzle hole having an uneven inner surface formed by a plurality of annular grooves to output an assist gas at a high flow velocity within a central region of said nozzle hole to cut said workpiece at a high speed.

2. A laser beam machining system for machining a workpiece while ejecting an assist gas, comprising:

a nozzle having a nozzle hole forming a laser beam irradiation path and an assist gas ejection path, the nozzle hole having a diameter approximately 1.5 times as large as a minimum spot diameter of a laser beam output at said nozzle hole, to output an assist gas at a high flow velocity within a central region of said nozzle hole.

* * * * *